US012313102B2

(12) United States Patent
Kondo et al.

(10) Patent No.: US 12,313,102 B2
(45) Date of Patent: May 27, 2025

(54) HYDRAULIC PUMP PERFORMANCE DETERIORATION DETECTION SYSTEM

(71) Applicant: KAWASAKI JUKOGYO KABUSHIKI KAISHA, Kobe (JP)

(72) Inventors: Akihiro Kondo, Kobe (JP); Hiroaki Mitsui, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/381,500

(22) Filed: Oct. 18, 2023

(65) Prior Publication Data

US 2024/0141885 A1 May 2, 2024

(30) Foreign Application Priority Data

Oct. 31, 2022 (JP) ................................ 2022-174247

(51) Int. Cl.
*F15B 21/08* (2006.01)
*F15B 19/00* (2006.01)
*F15B 20/00* (2006.01)

(52) U.S. Cl.
CPC ............ *F15B 21/08* (2013.01); *F15B 19/005* (2013.01); *F15B 20/004* (2013.01);
(Continued)

(58) Field of Classification Search
CPC ...... F15B 19/005; F15B 20/004; F15B 21/08; F15B 2211/45; F15B 2211/6309;
(Continued)

(56) References Cited

U.S. PATENT DOCUMENTS 5,563,351 A 10/1996 Miller
2004/0261608 A1 12/2004 Bugel et al.
(Continued)

FOREIGN PATENT DOCUMENTS

JP H07-280688 A 10/1995

OTHER PUBLICATIONS

U.S. Appl. No. 18/241,312, filed Sep. 1, 2023 in the name of Akihiro Kondo et al.
(Continued)

*Primary Examiner* — Matthew Wiblin
(74) *Attorney, Agent, or Firm* — Oliff PLC

(57) ABSTRACT

A hydraulic pump performance deterioration detection system according to one embodiment includes: a variable displacement hydraulic pump; a switching valve that is connected to the hydraulic pump by a pump line and to a hydraulic actuator by a supply/discharge line; and a regulator that changes a displacement of the hydraulic pump in accordance with a command current and that limits the displacement of the hydraulic pump to a limiting value when a delivery pressure of the hydraulic pump has become higher than a setting value. The performance deterioration detection system further includes: control circuitry that feeds the command current to the regulator; and a pressure sensor that measures the delivery pressure of the hydraulic pump. When the hydraulic actuator is not moving, the control circuitry determines whether or not performance of the hydraulic pump has deteriorated based on a current value of the command current and the delivery pressure of the hydraulic pump measured by the pressure sensor.

5 Claims, 3 Drawing Sheets

(52) U.S. Cl.
CPC ... *F15B 2211/45* (2013.01); *F15B 2211/6309* (2013.01); *F15B 2211/633* (2013.01); *F15B 2211/6651* (2013.01); *F15B 2211/6652* (2013.01); *F15B 2211/8633* (2013.01); *F15B 2211/87* (2013.01)

(58) Field of Classification Search
CPC ........ F15B 2211/633; F15B 2211/6651; F15B 2211/6652; F15B 2211/8633; F15B 2211/87
See application file for complete search history.

(56) References Cited

U.S. PATENT DOCUMENTS

| | | | |
|---|---|---|---|
| 2005/0022589 | A1 | 2/2005 | Du |
| 2016/0091004 | A1 | 3/2016 | Gomm et al. |
| 2022/0298755 | A1 | 9/2022 | Udagawa et al. |

OTHER PUBLICATIONS

U.S. Appl. No. 18/242,271, filed Sep. 5, 2023 in the name of Akihiro Kondo et al.
Jun. 5, 2024 Office Action issued in U.S. Appl. No. 18/242,271.
Nov. 12, 2024 Notice of Allowance issued in U.S. Appl. No. 18/242,271.
Aug. 14, 2024 Office Action issued in U.S. Appl. No. 18/241,312.
Dec. 17, 2024 Notice of Allowance issued in U.S. Appl. No. 18/241,312.

HYDRAULIC PUMP PERFORMANCE DETERIORATION DETECTION SYSTEM

CROSS-REFERENCE TO RELATED APPLICATION

This application claims priority to and the benefit of Japanese Patent Application No. 2022-174247, filed on Oct. 31, 2022, the entire disclosure of which is incorporated herein by reference.

BACKGROUND OF THE INVENTION

Field of the Invention

The present disclosure relates to a system for detecting performance deterioration of a hydraulic pump.

Description of the Related Art

Conventionally, a hydraulic circuit that supplies a hydraulic liquid from a hydraulic pump to a hydraulic actuator has been known. In such a hydraulic circuit, it is desired to detect performance deterioration of the hydraulic pump.

For example, Japanese Laid-Open Patent Application Publication No. H07-280688 discloses an apparatus that measures a drain flow rate from a hydraulic pump by a flowmeter and that determines based on the drain flow rate whether or not the hydraulic pump is worn.

SUMMARY OF THE INVENTION

However, since the drain flow rate is a slight flow rate, the measurement value of the flowmeter is readily affected by the measurement precision thereof. Therefore, based on the drain flow rate measured by the flowmeter, it is difficult to detect performance deterioration of the hydraulic pump, such as to detect a minute decrease in the delivery flow rate of the hydraulic pump due to wear of a sliding component of the hydraulic pump.

In view of the above, an object of the present disclosure is to provide a hydraulic pump performance deterioration detection system that is capable of detecting performance deterioration of a hydraulic pump without using a flowmeter.

In one aspect, the present disclosure provides a hydraulic pump performance deterioration detection system including: a variable displacement hydraulic pump; a switching valve that is connected to the hydraulic pump by a pump line and to a hydraulic actuator by a supply/discharge line and that blocks the pump line when the hydraulic actuator is not moving; a regulator that changes a displacement of the hydraulic pump in accordance with a command current and that limits the displacement of the hydraulic pump to a limiting value when a delivery pressure of the hydraulic pump has become higher than a setting value; control circuitry that feeds the command current to the regulator; and a pressure sensor that measures the delivery pressure of the hydraulic pump. When the hydraulic actuator is not moving, the control circuitry determines whether or not performance of the hydraulic pump has deteriorated based on a current value of the command current and the delivery pressure of the hydraulic pump measured by the pressure sensor.

In another aspect, the present disclosure provides a hydraulic pump performance deterioration detection system including: a hydraulic cylinder that extends to press a workpiece; a hydraulic pump that is connected to the hydraulic cylinder by a pair of supply/discharge lines in a manner to form a closed circuit; an electric motor that drives the hydraulic pump; control circuitry that controls the electric motor; and a pressure sensor that measures a delivery pressure of the hydraulic pump when the hydraulic cylinder extends. The control circuitry: while the hydraulic cylinder is pressing the workpiece, adjusts a rotation speed of the electric motor such that the delivery pressure of the hydraulic pump, which is measured by the pressure sensor, is a setting value; stores the adjusted rotation speed as a determination-use rotation speed; and compares the determination-use rotation speed that has been newly stored with a previously stored determination-use rotation speed to determine whether or not performance of the hydraulic pump has deteriorated.

According to the present disclosure, performance deterioration of a hydraulic pump can be detected without using a flowmeter.

DETAILED DESCRIPTION

Embodiment 1

Figure 1:
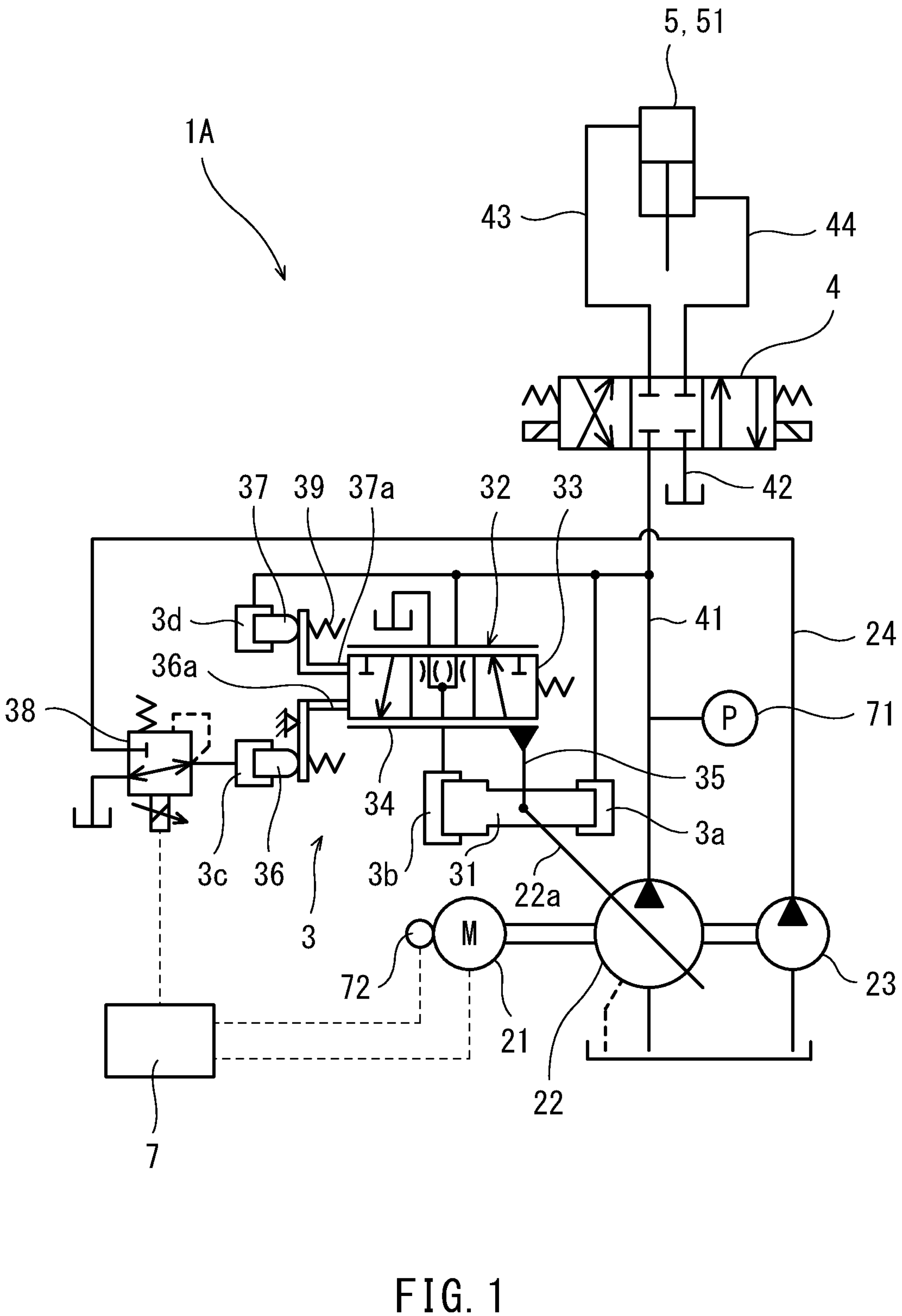
FIG. 1 shows a schematic configuration of a hydraulic pump performance deterioration detection system according to Embodiment 1.

FIG. 1 shows a hydraulic pump performance deterioration detection system 1A according to Embodiment 1. For example, the hydraulic pump performance deterioration detection system 1A is used for an industrial machine, such as an iron and steel making machine.

Specifically, the hydraulic pump performance deterioration detection system 1A includes: a variable displacement hydraulic pump 22; a regulator 3, which changes the displacement of the hydraulic pump 22; and a switching valve 4 located between the hydraulic pump 22 and a hydraulic actuator 5. In the illustrated example, the number of hydraulic actuators 5 is one. Alternatively, the number of hydraulic actuators 5 may be more than one, in which case, the number of switching valves 4 is also more than one.

In the present embodiment, the hydraulic actuator 5 is a hydraulic cylinder 51, which is a double-acting cylinder. Accordingly, the switching valve 4 is a three-position valve. Alternatively, the hydraulic actuator 5 may be a hydraulic motor. Further alternatively, the hydraulic actuator 5 may be a single-acting cylinder, and the switching valve 4 may be a two-position valve.

The hydraulic pump 22 is connected to the switching valve 4 by a pump line 41. The switching valve 4 is connected to a tank by a tank line 42, and to the hydraulic actuator 5 by a pair of supply/discharge lines 43 and 44. A relief line is branched off from the pump line 41, and a relief valve is located on the relief line.

When the hydraulic actuator 5 is not moving, the switching valve 4 is in a neutral position. As a result of the switching valve 4 being switched from the neutral position to a first acting position or a second acting position, the hydraulic actuator 5 moves in a first direction or a second direction.

In the present embodiment, when the switching valve 4 is in the neutral position, the switching valve 4 blocks all of the pump line 41, the tank line 42, and the supply/discharge lines 43 and 44. However, depending on the use application of the hydraulic actuator 5 or depending on the hydraulic circuit of the hydraulic actuator 5, when the switching valve 4 is in the neutral position, the switching valve 4 may block the pump line 41 while allowing the supply/discharge lines 43 and 44 to communicate with the tank line 42. When the switching valve 4 is in the first acting position, i.e., right-side position in FIG. 1, the switching valve 4 allows the pump line 41 to communicate with the supply/discharge line 43, and allows the supply/discharge line 44 to communicate with the tank line 42. When the switching valve 4 is in the second acting position, i.e., left-side position in FIG. 1, the switching valve 4 allows the pump line 41 to communicate with the supply/discharge line 44, and allows the supply/discharge line 43 to communicate with the tank line 42.

In the present embodiment, the hydraulic pump 22 is driven by an electric motor 21 at a constant rotation speed. The electric motor 21 is controlled by control circuitry 7. For example, the rotation speed of the hydraulic pump 22 is within the range of 1000 rpm to 1800 rpm. Alternatively, the hydraulic pump 22 may be driven by an engine.

In the present embodiment, the hydraulic pump 22 is one type of axial piston pump, specifically, a swash plate pump including a swash plate 22*a*. Alternatively, the hydraulic pump 22 may be a bent axis pump that is another type of axial piston pump. Further alternatively, the hydraulic pump 22 may be yet another type of pump, such as a vane pump.

The regulator 3 is fed with a command current from the control circuitry 7. In accordance with the command current, the regulator 3 changes the displacement q of the hydraulic pump 22, i.e., changes the amount of liquid delivered per rotation of the pump 22. In the present embodiment, the regulator 3 increases the displacement q of the hydraulic pump 22 in accordance with increase in the command current. In the present embodiment, the minimum displacement of the hydraulic pump 22 is zero. Alternatively, the minimum displacement of the hydraulic pump 22 may be set to be greater than zero.

Figure 2:
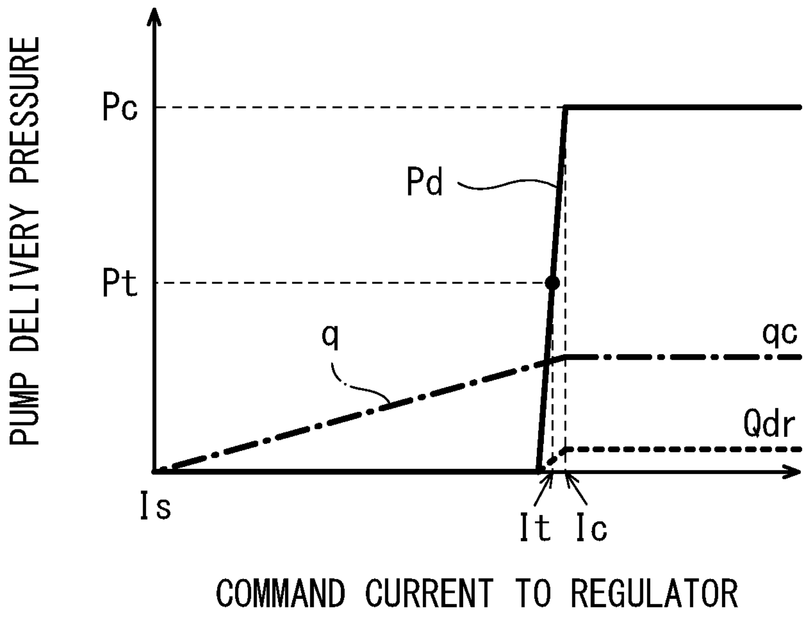
FIG. 2 is a graph showing a relationship between a command current fed to a regulator and a delivery pressure of a hydraulic pump.

Further, in the present embodiment, as shown in FIG. 2, when the delivery pressure Pd of the hydraulic pump 22 has become higher than a setting value Pc, the regulator 3 limits the displacement q of the hydraulic pump 22 to a limiting value qc. This is so-called cutoff. The cutoff is performed not through controlling by the control circuitry 7, but performed mechanically.

To be more specific, the regulator 3 includes a solenoid proportional valve 38, a flow control piston 36, and a cutoff piston 37. The solenoid proportional valve 38 is connected to an auxiliary pump 23 by a primary pressure line 24. The auxiliary pump 23 is, together with the hydraulic pump 22, driven by the electric motor 21.

The solenoid proportional valve 38 outputs a secondary pressure corresponding to the command current fed to the regulator 3. In the illustrated example, the solenoid proportional valve 38 is a direct proportional valve whose output secondary pressure and the command current indicate a positive correlation. Alternatively, the solenoid proportional valve 38 may be an inverse proportional valve whose output secondary pressure and the command current indicate a negative correlation.

The flow control piston 36 changes the displacement q of the hydraulic pump 22 in accordance with the secondary pressure of the solenoid proportional valve 38. When the delivery pressure Pd of the hydraulic pump 22 has become higher than the setting value Pc, the cutoff piston 37 takes priority over the flow control piston 36 and limits the displacement q of the hydraulic pump 22 to the limiting value qc.

The regulator 3, which includes the solenoid proportional valve 38, the flow control piston 36, and the cutoff piston 37, further includes: a servo piston 31 coupled to the swash plate 22*a* of the hydraulic pump 22; and an adjustment valve 32 to drive the servo piston 31.

The regulator 3 includes: a first pressure receiving chamber 3*a*, into which the delivery pressure Pd of the hydraulic pump 22 is led; and a second pressure receiving chamber 3*b*, into which a control pressure is led. The servo piston 31 includes: a first end portion exposed in the first pressure receiving chamber 3*a*; and a second end portion exposed in the second pressure receiving chamber 3*b*, the second end portion having a greater diameter than that of the first end portion.

The adjustment valve 32 adjusts the control pressure led into the second pressure receiving chamber 3*b*. Specifically, the adjustment valve 32 includes a spool 33 and a sleeve 34. The spool 33 shifts in a direction to decrease the control pressure, i.e., a displacement-increasing direction, and also shifts in a direction to increase the control pressure, i.e., a displacement-decreasing direction. The sleeve 34 accommodates the spool 33 therein. The displacement-increasing direction is a direction to the left in FIG. 1, and the displacement-decreasing direction is a direction to the right in FIG. 1.

The sleeve 34 is coupled to the servo piston 31 by a feedback lever 35. The sleeve 34 includes a pump port, a tank port, and an output port. The pump port communicates with the pump line 41. The tank port communicates with the tank. The output port communicates with the second pressure receiving chamber 3*b*.

The spool 33 is urged by a spring in the displacement-increasing direction, and pushed by the flow control piston 36 and the cutoff piston 37 in the displacement-decreasing direction. The flow control piston 36 pushes the spool 33 via a lever 36*a*, and the cutoff piston 37 pushes the spool 33 via a lever 37*a*. When the spool 33 is pushed by the flow control piston 36 or the cutoff piston 37 and thereby shifts in the displacement-decreasing direction against the urging force of the spring, an opening area between the pump port and the output port of the sleeve 34 increases and an opening area between the tank port and the output port of the sleeve 34 decreases, whereas when the spool 33 is urged by the spring and thereby shifts in the displacement-increasing direction, the opening area between the pump port and the output port of the sleeve 34 decreases and the opening area between the tank port and the output port of the sleeve 34 increases.

In the present embodiment, the spool 33 is pushed in the displacement-decreasing direction by backward movement of the flow control piston 36 and forward movement of the cutoff piston 37. However, whether each of the flow control piston 36 and the cutoff piston 37 moves forward or backward when pushing the spool 33 in the displacement-decreasing direction is changeable as necessary. The flow control piston 36 and the cutoff piston 37 are configured such that one of the flow control piston 36 or the cutoff piston 37 that limits the displacement to be smaller, i.e., that specifies the smaller displacement, preferentially pushes the spool 33. Since this configuration is a known technique, a detailed description thereof is omitted herein.

In accordance with a relative positional relationship between the sleeve 34 and the spool 33, the output port of the sleeve 34 communicates with one of or both the pump port and the tank port. When the spool 33 shifts in the displacement-increasing direction or in the displacement-decreasing direction, the spool 33 and the sleeve 34 are brought into such a relative positional relationship that forces applied from both sides of the servo piston 31 are balanced, and thereby the control pressure is adjusted. Each of the forces applied from both sides of the servo piston 31 is calculated by multiplying a pressure by the pressure receiving area of the servo piston 31.

The regulator 3 further includes an actuating chamber 3*c*, which applies the secondary pressure of the solenoid proportional valve 38 to the flow control piston 36. That is, when the secondary pressure of the solenoid proportional valve 38 increases, the flow control piston 36 moves forward, and when the secondary pressure of the solenoid proportional valve 38 decreases, the flow control piston 36 moves backward.

The regulator 3 further includes an actuating chamber 3*d*, which applies the delivery pressure Pd of the hydraulic pump 22 to the cutoff piston 37. That is, the cutoff piston 37 moves forward when the delivery pressure Pd of the hydraulic pump 22 has become higher than the setting value Pc, which is set by a spring 39, and moves backward when the delivery pressure Pd has become lower than the setting value Pc.

Regarding the control circuitry 7, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The control circuitry 7 is electrically connected to a pressure sensor 71 located on the pump line 41 and a rotation speed meter 72 located on the electric motor 21. In FIG. 1, the illustration of part of signal lines is omitted for the purpose of simplifying the drawing. The pressure sensor 71 measures the delivery pressure Pd of the hydraulic pump 22, and the rotation speed meter 72 measures the rotation speed of the electric motor 21.

The control circuitry 7 performs a performance check on the hydraulic pump 22 when the hydraulic actuator 5 is not moving, i.e., when the hydraulic pump 22 is not supplying the hydraulic liquid to the hydraulic actuator 5. On the other hand, when performing no performance check on the hydraulic pump 22, the control circuitry 7 feeds, to the regulator 3, such a command current that the displacement q of the hydraulic pump 22 is maximized.

When performing a performance check on the hydraulic pump 22, the control circuitry 7 first controls the regulator 3 to minimize the displacement q of the hydraulic pump 22. Specifically, the control circuitry 7 sets the command current to feed to the regulator 3 to zero. Alternatively, the control circuitry 7 may feed, as the command current to the regulator 3, a standby current greater than zero such that the displacement q of the hydraulic pump 22 is kept to the minimum.

In a state where the pump line 41 is blocked by the switching valve 4, as shown in FIG. 2, when the hydraulic pump 22 is being driven with a relatively small displacement, the delivery pressure Pd of the hydraulic pump 22 does not become so high due to factors such as internal leakage of the hydraulic pump 22. In the present embodiment, the factors also include leakage of the switching valve 4 in addition to the internal leakage of the hydraulic pump 22.

In this state, the control circuitry 7 determines whether or not the performance of the hydraulic pump 22 has deteriorated based on the current value of the command current fed to the regulator 3 and the delivery pressure Pd of the hydraulic pump 22 measured by the pressure sensor 71.

To be more specific, as shown in FIG. 2, the control circuitry 7 increases the command current fed to the regulator 3 from a predetermined value Is, and when the delivery pressure Pd of the hydraulic pump 22 measured by the pressure sensor 71 has become a threshold value Pt, in other words, when the delivery pressure Pd of the hydraulic pump 22 has increased to the threshold value Pt, the control circuitry 7 stores the current value of the command current at the time as a determination-use current value It. In the present embodiment, the predetermined value Is is zero.

As shown in FIG. 2, the displacement q of the hydraulic pump 22 increases in accordance with increase in the command current fed to the regulator 3. However, so long as the amount of hydraulic liquid delivered from the hydraulic pump 22 is a minute amount, the delivery pressure Pd of the hydraulic pump 22 is substantially zero. If the delivery of the hydraulic liquid from the hydraulic pump 22 increases to a small degree, the delivery pressure Pd of the hydraulic pump 22 increases, and a drain flow rate Qdr also increases. Since a high-pressure seal portion of the hydraulic pump 22 has a substantially constant gap, even when the delivery pressure Pd increases, the leakage amount of the hydraulic pump 22 does not change much. Accordingly, the delivery pressure Pd increases rapidly. When the delivery pressure Pd has become higher than the aforementioned setting value Pc, the cutoff piston 37 moves, and the displacement q is limited to the limiting value qc.

The aforementioned threshold value Pt may be, as shown in FIG. 2, less than the cutoff setting value Pc, or may be equal to the setting value Pc. In a case where the threshold value Pt is equal to the setting value Pc, the determination-use current value It is equal to a cutoff start current value Ic, at which the cutoff is started. Since the delivery pressure Pd increases rapidly as mentioned above, the threshold value Pt being equal to the setting value Pc is an easy setting.

The control circuitry 7 prestores a reference current value I0. The reference current value I0 is the current value, of the command current, obtained when the delivery pressure Pd of the hydraulic pump 22 has become the threshold value Pt in a case where there is no abnormality in the hydraulic pump 22. Examples of a case where there is no abnormality in the hydraulic pump 22 and the reference current value I0 may be obtained include the following cases: after hydraulic drive equipment including the hydraulic pump 22 is mounted to an industrial machine and has been operated for a short period of time but before the shipment of the industrial machine from the factory; and shortly after the fully assembled industrial machine is shipped from the factory and after the hydraulic drive equipment has been operated only for a short period of time. The reference current value I0 may be the current value, of the command current, obtained when the delivery pressure Pd of the hydraulic pump 22 has become the threshold value Pt in a case where a performance check is more simply performed on the hydraulic pump 22 alone.

The control circuitry 7 compares the stored determination-use current value It with the reference current value I0. In a case where the determination-use current value It is greater than the reference current value I0 by at least a setting value V, i.e., It−I0≥V, the control circuitry 7 determines that the performance of the hydraulic pump 22 has deteriorated. On the other hand, in a case where the determination-use current value It is not greater than the reference current value I0 by at least the setting value V, i.e., It−I0<V, the control circuitry 7 determines that the performance of the hydraulic pump 22 has not deteriorated.

In a case where the displacement q of the hydraulic pump 22 is increased from a relatively small displacement by increasing the command current fed to the regulator 3, the current value of the command current at which the delivery pressure Pd of the hydraulic pump 22 becomes the threshold value Pt varies depending on the degree of an abnormality in the hydraulic pump 22. In a case where the hydraulic pump 22 is a swash plate pump as in the present embodiment, examples of the abnormality in the hydraulic pump 22 include: wear of a shoe on the distal end of a piston, the shoe sliding on the swash plate; and wear of a sliding surface between a valve plate and a cylinder block. Therefore, by using the current value of the command current fed to the regulator 3 and the delivery pressure Pd of the hydraulic pump 22 as in the present embodiment, performance deterioration of the hydraulic pump 22 can be detected without using a flowmeter, and in addition, performance deterioration of the hydraulic pump 22 can be detected with a higher precision than in a case where the performance deterioration detection is performed by measuring a drain flow rate.

Moreover, a performance check on a hydraulic pump in a hydraulic system installed in an existing industrial machine can be made possible merely by: replacing a regulator in the hydraulic system with the above-described regulator 3; and incorporating, in the hydraulic system, the above-described control circuitry 7 in addition to existing control circuitry. Furthermore, when no performance check on the hydraulic pump 22 is performed, i.e., at a normal time, the displacement-limiting function by the cutoff piston 37 can be exerted while keeping the displacement q of the hydraulic pump 22 to the maximum.

<Variations>

In the above-described embodiment, at the time of storing, as the determination-use current value It, the current value of the command current when the delivery pressure Pd of the hydraulic pump 22 has become the threshold value Pt, the control circuitry 7 increases the displacement q of the hydraulic pump 22 from a relatively small displacement by increasing the command current fed to the regulator 3. Conversely, the control circuitry 7 may decrease the displacement q of the hydraulic pump 22 from a relatively large displacement by decreasing the command current fed to the regulator 3, and when the delivery pressure Pd of the hydraulic pump 22 measured by the pressure sensor 71 has decreased to the threshold value Pt, the control circuitry 7 may store the current value of the command current at the time as the determination-use current value It. Also in the case of decreasing the displacement q of the hydraulic pump 22 from a relatively large displacement, the current value of the command current at which the delivery pressure Pd of the hydraulic pump 22 becomes the threshold value Pt varies depending on the degree of an abnormality in the hydraulic pump 22. Therefore, also in this case, by using the current value of the command current fed to the regulator 3 and the delivery pressure Pd of the hydraulic pump 22, performance deterioration of the hydraulic pump 22 can be detected without using a flowmeter.

The regulator 3 may be of a type that decreases the displacement q of the hydraulic pump 22 in accordance with increase in the command current. Also in this case, at the time of storing, as the determination-use current value It, the current value of the command current when the delivery pressure Pd of the hydraulic pump 22 has become the threshold value Pt, the control circuitry 7 may increase the displacement q of the hydraulic pump 22 from a relatively small displacement by decreasing the command current fed to the regulator 3, or may decrease the displacement q of the hydraulic pump 22 from a relatively large displacement by increasing the command current fed to the regulator 3.

Embodiment 2

Figure 3:
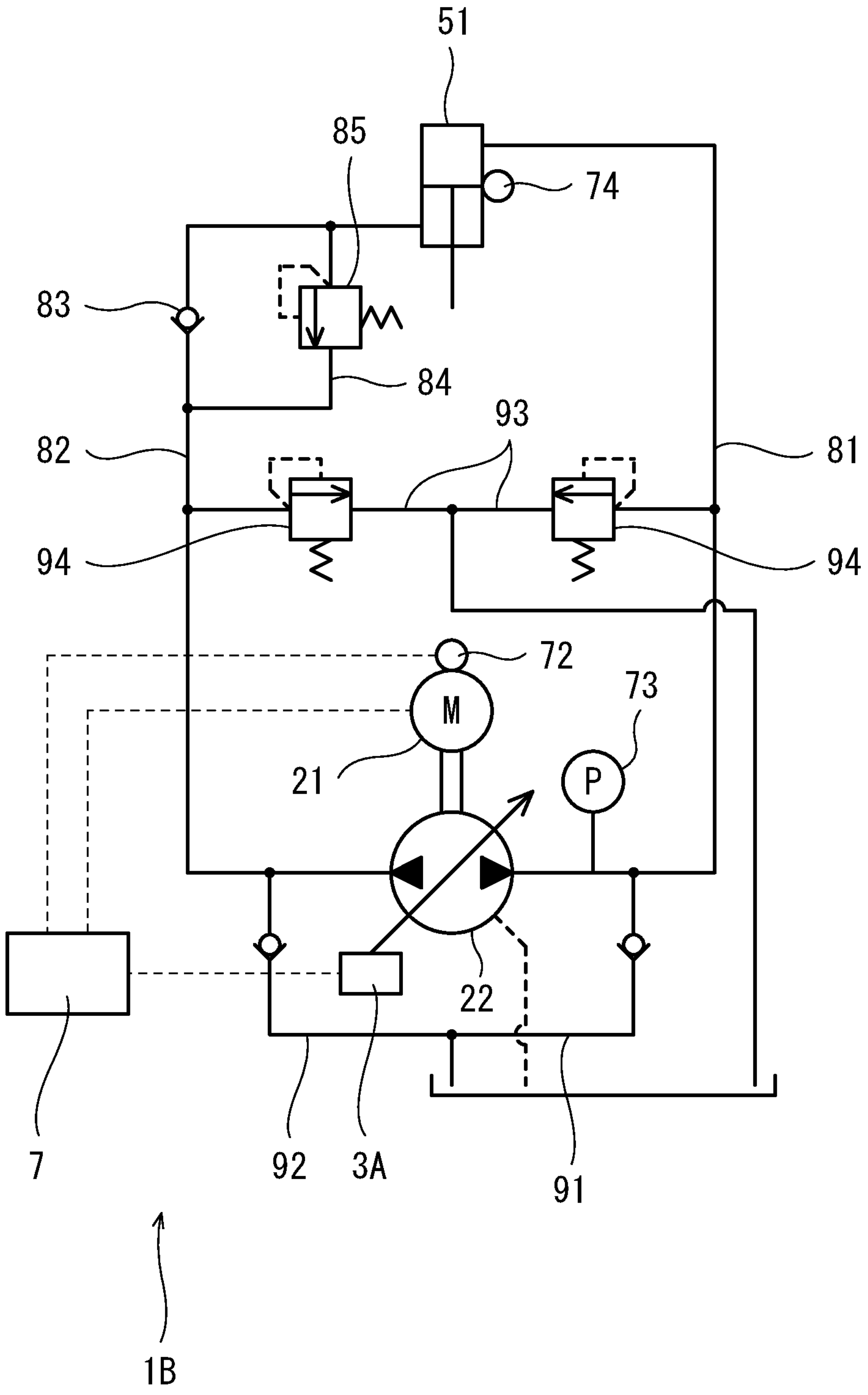
FIG. 3 shows a schematic configuration of a hydraulic pump performance deterioration detection system according to Embodiment 2.

FIG. 3 shows a hydraulic pump performance deterioration detection system 1B according to Embodiment 2. For example, the hydraulic pump performance deterioration detection system 1B is used for an industrial machine, such as a press machine. In the present embodiment, the same components as those described in Embodiment 1 are denoted by the same reference signs as those used in Embodiment 1, and repeating the same descriptions is avoided.

Also in the present embodiment, the hydraulic pump 22 is a variable displacement pump. However, in the present embodiment, the hydraulic pump 22 is of a two-position switching type. Depending on the type of the industrial machine, the hydraulic pump 22 may be a fixed displacement pump.

In the present embodiment, the hydraulic pump 22 supplies a hydraulic liquid to the hydraulic cylinder 51. The hydraulic cylinder 51 is a double-acting cylinder that extends to press a workpiece. The hydraulic cylinder 51 presses the workpiece via a presser that is mounted to the rod of the hydraulic cylinder 51. In the case of a press machine, the presser is a mold. For example, the direction in which the hydraulic cylinder 51 extends is the vertically downward direction.

The electric motor 21 to drive the hydraulic pump 22 is, for example, a servomotor. In this case, the control circuitry 7 may have a servo amplifier function, or a servo amplifier may be located between the control circuitry 7 and the electric motor 21.

In the present embodiment, as mentioned above, the hydraulic pump 22 is of a two-position switching type. Accordingly, the present embodiment adopts a regulator 3A, which changes the displacement q of the hydraulic pump 22 between a first displacement and a second displacement. The second displacement is less than the first displacement. For example, the regulator 3A may include: the servo piston 31 as shown in FIG. 1, which includes the first end portion exposed in the first pressure receiving chamber 3*a* and the second end portion exposed in the second pressure receiving chamber 3*b*; and a switching valve that switches whether to allow the second pressure receiving chamber 3*b* to communicate with the pump line 41 or with the tank.

Further, in the present embodiment, the hydraulic pump 22 is a bi-directional pump that is rotatable bi-directionally.

Specifically, the hydraulic pump 22 includes a first port and a second port. When the hydraulic pump 22 rotates in one direction, the first port serves as a suction port, and the second port serves as a delivery port. When the hydraulic pump 3 rotates in the other direction, the second port serves as a suction port, and the first port serves as a delivery port.

The hydraulic pump 22, which is a bi-directional pump, is connected to the hydraulic cylinder 51 by a pair of supply/discharge lines 81 and 82 in a manner to form a closed circuit. To be more specific, the supply/discharge line 81 is connected to the head side of the hydraulic cylinder 51, and the supply/discharge line 82 is connected to the rod side of the hydraulic cylinder 51.

The supply/discharge line 81 is connected to the tank by a replenishment line 91, and a check valve is located on the replenishment line 91. Similarly, the supply/discharge line 82 is connected to the tank by a replenishment line 92, and a check valve is located on the replenishment line 92. Relief lines 93, on which respective relief valves 94 are located, are connected to the supply/discharge lines 81 and 82, respectively.

A check valve 83 is located on the rod-side supply/discharge line 82, and a bypass line 84 is connected to the rod-side supply/discharge line 82 in a manner to bypass the check valve 83. A relief valve 85 is located on the bypass line 84. The check valve 83 allows a flow from the hydraulic pump 22 toward the rod side of the hydraulic cylinder 51, but prevents the reverse flow.

A pressure sensor 73 is located on the supply/discharge line 81. That is, the pressure sensor 73 measures the delivery pressure Pd of the hydraulic pump 22 when the hydraulic cylinder 51 extends. The control circuitry 7 is electrically connected to the pressure sensor 73. In FIG. 3, the illustration of part of signal lines is omitted for the purpose of simplifying the drawing. Further, the control circuitry 7 is, similar to Embodiment 1, electrically connected to the rotation speed meter 72, which measures the rotation speed of the electric motor 21, and also electrically connected to a stroke sensor 74 located on the hydraulic cylinder 51. The stroke sensor 74 measures the stroke of the rod of the hydraulic cylinder 51.

The control circuitry 7 receives an input of a first operation signal that is an extension command to the hydraulic cylinder 51 and an input of a second operation signal that is a retraction command to the hydraulic cylinder 51. The control circuitry 7 controls the electric motor 21 and the regulator 3A based on the first operation signal and the second operation signal.

First, when the first operation signal is inputted to the control circuitry 7, the control circuitry 7 controls the regulator 3A to regulate the displacement q of the hydraulic pump 22 to the first displacement, which is the greater displacement. Thereafter, the control circuitry 7 rotates the electric motor 21 in such a direction that the hydraulic pump 22 delivers the hydraulic liquid to the head side of the hydraulic cylinder 51 through the supply/discharge line 81. When the rod-side pressure of the hydraulic cylinder 51 has become higher than the setting pressure of the relief valve 85, the hydraulic cylinder 51 extends at high speed. The speed of the hydraulic cylinder 51 is determined by the flow rate into the head side.

When the stroke measured by the stroke sensor 74 has reached a predetermined value, the control circuitry 7 controls the regulator 3A to regulate the displacement q of the hydraulic pump 22 to the second displacement, which is the smaller displacement. Consequently, the hydraulic cylinder 51 extends at low speed while the rod-side pressure of the hydraulic cylinder 51 is kept to the setting pressure of the relief valve 85.

Thereafter, when the presser comes into contact with the workpiece and the hydraulic cylinder 51 starts pressing the workpiece via the presser, the delivery pressure Pd of the hydraulic pump 22 increases. While the hydraulic cylinder 51 is pressing the workpiece, the control circuitry 7 adjusts the rotation speed of the electric motor 21, such that the delivery pressure Pd of the hydraulic pump 22, which is measured by the pressure sensor 73, is a setting value.

In the present embodiment, while the hydraulic cylinder 51 is pressing the workpiece, the control circuitry 7 performs a performance check on the hydraulic pump 22. Specifically, the control circuitry 7 stores, as a determination-use rotation speed N, the rotation speed of the electric motor 21 that has been adjusted such that the delivery pressure Pd of the hydraulic pump 22 is the setting value. Then, the control circuitry 7 compares the determination-use rotation speed N that has been newly stored, i.e., a determination-use rotation speed Nn, with a previously stored determination-use rotation speed Np to determine whether nor not the performance of the hydraulic pump 22 has deteriorated. For example, the previously stored determination-use rotation speed Np may be a record from one or several years ago.

For example, in a case where the newly stored determination-use rotation speed Nn is greater than the previously stored determination-use rotation speed Np by at least a predetermined value, the control circuitry 7 determines that the performance of the hydraulic pump 22 has deteriorated, whereas in a case where the newly stored determination-use rotation speed Nn is not greater than the previously stored determination-use rotation speed Np by at least the predetermined value, the control circuitry 7 determines that the performance of the hydraulic pump 22 has not deteriorated.

In the present embodiment, the rotation speed of the electric motor 21 to keep the delivery pressure Pd of the hydraulic pump 22 to the setting value at the time of pressing the workpiece varies depending on the degree of an abnormality in the hydraulic pump 22. Therefore, by using the rotation speed of the electric motor 21 and the delivery pressure Pd of the hydraulic pump 22, performance deterioration of the hydraulic pump 22 can be detected without using a flowmeter, and in addition, performance deterioration of the hydraulic pump 22 can be detected with a higher precision than in a case where the performance deterioration detection is performed by measuring a drain flow rate. Moreover, performance deterioration of the hydraulic pump 22 can be detected while machining the workpiece as a normal process, and no special process needs to be added for the performance deterioration detection. Thus, no extra downtime occurs.

When the second operation signal is inputted to the control circuitry 7, the control circuitry 7 rotates the electric motor 21 in such a direction that the hydraulic pump 22 delivers the hydraulic liquid to the rod side of the hydraulic cylinder 51 through the supply/discharge line 82. Consequently, the hydraulic cylinder 51 retracts.

Other Embodiments

The present disclosure is not limited to the above-described embodiment. Various modifications can be made without departing from the scope of the present disclosure.

SUMMARY

In one aspect, the present disclosure provides, as a first mode, a hydraulic pump performance deterioration detection system including: a variable displacement hydraulic pump; a switching valve that is connected to the hydraulic pump by a pump line and to a hydraulic actuator by a supply/discharge line and that blocks the pump line when the hydraulic actuator is not moving; a regulator that changes a displacement of the hydraulic pump in accordance with a command current and that limits the displacement of the hydraulic pump to a limiting value when a delivery pressure of the hydraulic pump has become higher than a setting value; control circuitry that feeds the command current to the regulator; and a pressure sensor that measures the delivery pressure of the hydraulic pump. When the hydraulic actuator is not moving, the control circuitry determines whether or not performance of the hydraulic pump has deteriorated based on a current value of the command current and the delivery pressure of the hydraulic pump measured by the pressure sensor.

According to the above configuration, in a state where the pump line is blocked by the switching valve, when the hydraulic pump is being driven with a relatively small displacement, the delivery pressure of the hydraulic pump does not become so high due to factors such as internal leakage of the hydraulic pump. In a case where the displacement of the hydraulic pump is increased from a relatively small displacement, or decreased from a relatively large displacement, by changing the command current fed to the regulator, the current value of the command current at which the delivery pressure of the hydraulic pump becomes a threshold value varies depending on the degree of an abnormality in the hydraulic pump. Therefore, by using the current value of the command current fed to the regulator and the delivery pressure of the hydraulic pump, performance deterioration of the hydraulic pump can be detected without using a flowmeter, and in addition, performance deterioration of the hydraulic pump can be detected with a higher precision than in a case where the performance deterioration detection is performed by measuring a drain flow rate.

As a second mode, in the first mode, for example, the control circuitry may: change the command current when the hydraulic actuator is not moving; store, as a determination-use current value, the current value of the command current when the delivery pressure of the hydraulic pump measured by the pressure sensor has become a threshold value; compare the stored determination-use current value with a prestored reference current value; and determine that the performance of the hydraulic pump has deteriorated in a case where the determination-use current value is greater than the reference current value by at least a setting value.

As a third mode, in the second mode, for example, the regulator may increase the displacement of the hydraulic pump in accordance with increase in the command current, and at a time of storing, as the determination-use current value, the current value of the command current when the delivery pressure of the hydraulic pump measured by the pressure sensor has become the threshold value, the control circuitry may increase the command current from a predetermined value.

As a fourth mode, in the third mode, the regulator may include: a solenoid proportional valve that outputs a secondary pressure corresponding to the command current; a flow control piston that changes the displacement of the hydraulic pump in accordance with the secondary pressure of the solenoid proportional valve; and a cutoff piston that takes priority over the flow control piston and limits the displacement of the hydraulic pump to the limiting value when the delivery pressure of the hydraulic pump has become higher than the setting value, and when performing no performance check on the hydraulic pump, the control circuitry feeds, to the regulator, such a command current that the displacement of the hydraulic pump is maximized. According to this configuration, a performance check on a hydraulic pump in a hydraulic system installed in an existing industrial machine can be made possible merely by: replacing a regulator in the hydraulic system with the above-described regulator; and incorporating, in the hydraulic system, the above-described control circuitry in addition to existing control circuitry. Moreover, when no performance check on the hydraulic pump is performed, i.e., at a normal time, the displacement-limiting function by the cutoff piston can be exerted while keeping the displacement of the hydraulic pump to the maximum.

In another aspect, the present disclosure provides, as a fifth mode, a hydraulic pump performance deterioration detection system including: a hydraulic cylinder that extends to press a workpiece; a hydraulic pump that is connected to the hydraulic cylinder by a pair of supply/discharge lines in a manner to form a closed circuit; an electric motor that drives the hydraulic pump; control circuitry that controls the electric motor; and a pressure sensor that measures a delivery pressure of the hydraulic pump when the hydraulic cylinder extends. The control circuitry: while the hydraulic cylinder is pressing the workpiece, adjusts a rotation speed of the electric motor such that the delivery pressure of the hydraulic pump, which is measured by the pressure sensor, is a setting value; stores the adjusted rotation speed as a determination-use rotation speed; and compares the determination-use rotation speed that has been newly stored with a previously stored determination-use rotation speed to determine whether or not performance of the hydraulic pump has deteriorated.

According to the above configuration, the rotation speed of the electric motor to keep the delivery pressure of the hydraulic pump to the setting value at the time of pressing the workpiece varies depending on the degree of an abnormality in the hydraulic pump. Therefore, by using the rotation speed of the electric motor and the delivery pressure of the hydraulic pump, performance deterioration of the hydraulic pump can be detected without using a flowmeter, and in addition, performance deterioration of the hydraulic pump can be detected with a higher precision than in a case where the performance deterioration detection is performed by measuring a drain flow rate. Moreover, performance deterioration of the hydraulic pump can be detected while machining the workpiece as a normal process, and no special process needs to be added for the performance deterioration detection. Thus, no extra downtime occurs.

What is claimed is:

1. A hydraulic pump performance deterioration detection system comprising:

a variable displacement hydraulic pump;

a switching valve that is connected to the hydraulic pump by a pump line, connected to a tank by a tank line, and connected to a hydraulic actuator by a pair of supply/discharge lines, wherein placing the switching valve in a neutral position in which the switching valve blocks the pump line causes the hydraulic actuator to not move, and the switching valve is switched from the neutral position to a first acting position in which the switching valve causes the hydraulic actuator to move in a first direction, or to a second acting position in which the switching valve causes the hydraulic actuator to move in a second direction;

a regulator that changes a displacement of the hydraulic pump in accordance with a command current and that limits the displacement of the hydraulic pump to a limiting value when a delivery pressure of the hydraulic pump has become higher than a setting value;

control circuitry that feeds the command current to the regulator, the control circuitry including a hardware processor; and a pressure sensor that measures the delivery pressure of the hydraulic pump, wherein with the hydraulic actuator not moving the control circuitry:

feeds the command current to the regulator such that the displacement of the hydraulic pump is minimized, and performs a performance check to determine whether or not performance of the hydraulic pump has deteriorated based on a current value of the command current and the delivery pressure of the hydraulic pump measured by the pressure sensor.

2. A hydraulic pump performance deterioration detection system comprising:

a variable displacement hydraulic pump;

a switching valve that is connected to the hydraulic pump by a pump line and to a hydraulic actuator by a supply/discharge line and that blocks the pump line causing the hydraulic actuator to not move;

a regulator that changes a displacement of the hydraulic pump in accordance with a command current and that limits the displacement of the hydraulic pump to a limiting value when a delivery pressure of the hydraulic pump has become higher than a setting value;

control circuitry that feeds the command current to the regulator, the control circuitry including a hardware processor; and a pressure sensor that measures the delivery pressure of the hydraulic pump, wherein with the hydraulic actuator not moving the control circuitry:

feeds the command current to the regulator such that the displacement of the hydraulic pump is minimized, performs a performance check to determine whether or not performance of the hydraulic pump has deteriorated based on a current value of the command current and the delivery pressure of the hydraulic pump measured by the pressure sensor, and wherein the control circuitry further:

changes the command current stores, as a determination-use current value, the current value of the command current when the delivery pressure of the hydraulic pump measured by the pressure sensor has become a threshold value;

compares the stored determination-use current value with a prestored reference current value; and determines that the performance of the hydraulic pump has deteriorated in a case where the determination-use current value is greater than the reference current value by at least a setting value.

3. The hydraulic pump performance deterioration detection system according to claim 2, wherein the regulator increases the displacement of the hydraulic pump in accordance with the change in the command current, and the control circuitry stores, as the determination-use current value, the current value of the command current when the delivery pressure of the hydraulic pump measured by the pressure sensor has become the threshold value, after increasing the command current from a predetermined value.

4. The hydraulic pump performance deterioration detection system according to claim 3, wherein the regulator includes:

a solenoid proportional valve that outputs a secondary pressure corresponding to the command current;

a flow control piston that changes the displacement of the hydraulic pump in accordance with the secondary pressure of the solenoid proportional valve; and a cutoff piston that takes priority over the flow control piston and limits the displacement of the hydraulic pump to the limiting value when the delivery pressure of the hydraulic pump has become higher than the setting value, and when not performing the performance check on the hydraulic pump, the control circuitry feeds, to the regulator, a command current such that the displacement of the hydraulic pump is maximized.

5. A hydraulic pump performance deterioration detection system comprising:

a hydraulic cylinder that extends to press a workpiece;

a hydraulic pump that is connected to the hydraulic cylinder by a pair of supply/discharge lines in a manner to form a closed circuit;

an electric motor that drives the hydraulic pump;

control circuitry that controls the electric motor, the control circuitry including a hardware processor; and a pressure sensor that measures a delivery pressure of the hydraulic pump when the hydraulic cylinder extends, wherein the control circuitry:

while the hydraulic cylinder is pressing the workpiece, adjusts a rotation speed of the electric motor such that the delivery pressure of the hydraulic pump, which is measured by the pressure sensor, is a setting value;

stores the adjusted rotation speed as a determination-use rotation speed; and compares the determination-use rotation speed that has been newly stored with a previously stored determination-use rotation speed to determine whether or not performance of the hydraulic pump has deteriorated.

* * * * *